(12) United States Patent
Boday et al.

(10) Patent No.: US 8,919,388 B2
(45) Date of Patent: Dec. 30, 2014

(54) IMPLEMENTING PRE-TREATMENT OF WATER COOLING HOSES TO INCREASE RELIABILITY

(71) Applicant: International Business Machines Corporation, Armonk, NY (US)

(72) Inventors: Dylan J. Boday, Tucson, AZ (US); Joseph Kuczynski, Rochester, MN (US); Prabjit Singh, Poughkeepsie, NY (US); Jason T. Wertz, Wappingers Falls, NY (US); Jing Zhang, Poughkeesie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/744,785

(22) Filed: Jan. 18, 2013

(65) Prior Publication Data
US 2014/0202573 A1   Jul. 24, 2014

(51) Int. Cl.
*F16L 11/00* (2006.01)
*B23P 6/00* (2006.01)

(52) U.S. Cl.
CPC .. *F16L 11/00* (2013.01); *B23P 6/00* (2013.01)
USPC .......................................... 138/118; 427/235

(58) Field of Classification Search
None
See application file for complete search history.

(56) References Cited

U.S. PATENT DOCUMENTS

| 4,333,516 | A | * | 6/1982 | Krueger et al. ............ 165/134.1 |
| 4,338,997 | A | * | 7/1982 | Krueger et al. ............ 165/134.1 |
| 4,406,811 | A | | 9/1983 | Christensen et al. |
| 4,782,891 | A | * | 11/1988 | Cheadle et al. ............ 165/134.1 |
| 4,877,552 | A | | 10/1989 | Haring |
| 6,183,649 | B1 | | 2/2001 | Fontana |
| 6,808,014 | B2 | | 10/2004 | Minamitani et al. |
| 7,242,581 | B2 | | 7/2007 | Minamitani et al. |
| 8,182,879 | B2 | | 5/2012 | Sugaya et al. |
| 2010/0263572 | A1 | | 10/2010 | Sugaya et al. |
| 2012/0199311 | A1 | | 8/2012 | Campbell et al. |

FOREIGN PATENT DOCUMENTS

EP    0785908 B1   1/2001

* cited by examiner

*Primary Examiner* — William Phillip Fletcher, III
(74) *Attorney, Agent, or Firm* — Joan Pennington

(57) ABSTRACT

Pre-treated water cooling hoses and a method for implementing pretreatment of water cooling hoses for increased reliability are provided. Pretreatment of the water cooling hoses includes attaching the water cooling hose to a water cooling system, filling the water cooling system with a high concentration corrosion inhibitor solution, and running the system for an extended time to saturate the attached hose with the high concentration corrosion inhibitor.

10 Claims, 2 Drawing Sheets

IMPLEMENTING PRE-TREATMENT OF WATER COOLING HOSES TO INCREASE RELIABILITY

FIELD OF THE INVENTION

The present invention relates generally to the data processing field, and more particularly, relates to pre-treated water cooling hoses and a method for implementing pretreatment of water cooling hoses for increased reliability.

DESCRIPTION OF THE RELATED ART

Current high performance computer systems have rapidly migrated to water cooling solutions to effectively remove the massive heat load from the central electronic complex (CEC). The system design typically includes a flexible tubing option incorporating a large number of connections to a cold plate/heat sink.

The cooling liquid chosen is typically a deionized water solution containing a corrosion inhibitor to protect the copper within the system from corroding. Challenges arise though due to depletion of the corrosion inhibitors to other materials such as the hose, which ultimately may lead to the corroding of the copper components and present a challenge to ensure adequate product reliability over the life of the system.

A need exists for an efficient and effective pretreatment of the water cooling hoses to maintain acceptable levels of corrosion inhibitors within the water cooling loop over the life of the system. It is desirable to provide such pretreatment for water cooling hoses including ethylene propylene diene monomer (EPDM) water cooling hoses.

EPDM rubber (ethylene propylene diene monomer rubber) is a type of synthetic rubber, which is an elastomer or a polymer with viscoelasticity, often used in water cooling applications.

SUMMARY OF THE INVENTION

Principal aspects of the present invention are to provide pre-treated water cooling hoses and a method for implementing pretreatment of water cooling hoses for increased reliability. Other important aspects of the present invention are to provide such pre-treated water cooling hoses and method substantially without negative effects and that overcome many of the disadvantages of prior art arrangements.

In brief, pre-treated water cooling hoses and a method for implementing pretreatment of water cooling hoses for increased reliability are provided. Pretreatment of the water cooling hoses includes attaching the water cooling hose to a water cooling system, filling the water cooling system with a high concentration corrosion inhibitor solution, and running the system for an extended time to saturate the attached hose with the high concentration corrosion inhibitor.

In accordance with features of the invention, the water cooling hoses include an ethylene propylene diene monomer (EPDM) water cooling hoses. The water cooling hoses include zinc oxide cured hoses. The high concentration corrosion inhibitor solution used for pretreatment of the water cooling hoses includes a high concentration solution of benzotriazole (BTA), such as 10,000 ppm BTA.

In accordance with features of the invention, the pretreatment method enables the use of zinc oxide hoses, eliminating the need for processing by peroxide curing.

In accordance with features of the invention, the pre-treated water cooling hoses provide increased reliability.

In accordance with features of the invention, the pre-treated water cooling hoses maintain acceptable levels of corrosion inhibitors within the water cooling loop over the life of the system.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, pre-treated water cooling hoses and a method for implementing pretreatment of water cooling hoses for increased reliability are provided.

EPDM rubber (ethylene propylene diene monomer rubber) is a type of synthetic rubber, which is an elastomer or a polymer with viscoelasticity, often used in water cooling applications. Benzotriazole (BTA) is a common copper corrosion inhibitor that adsorbs to metal oxides including MgO, PbO, ZnO, and the like. These metal oxides are typically found in EPDM hoses.

In order to prevent the adsorption of BTA onto metal oxides, hoses are usually processed by peroxide curing without zinc oxide. This process of peroxide curing further drives up the cost of a typically inexpensive hose and complicates manufacturing due to the requirement of inert atmospheres.

To overcome cost and depletion challenges, the present invention provides a method to prevent significant depletion of BTA in metal oxide containing EPDM hoses. Typically, systems run 1000 ppm BTA solutions with the intent that the BTA will be maintained over the life of the system. This is possible with peroxide cured hoses but not with zinc oxide. The method of the present invention allows the use of zinc oxide hoses by utilizing a pre-treatment process in manufacturing settings.

Example Pretreatment of Water Cooling Hoses

Figure 1:
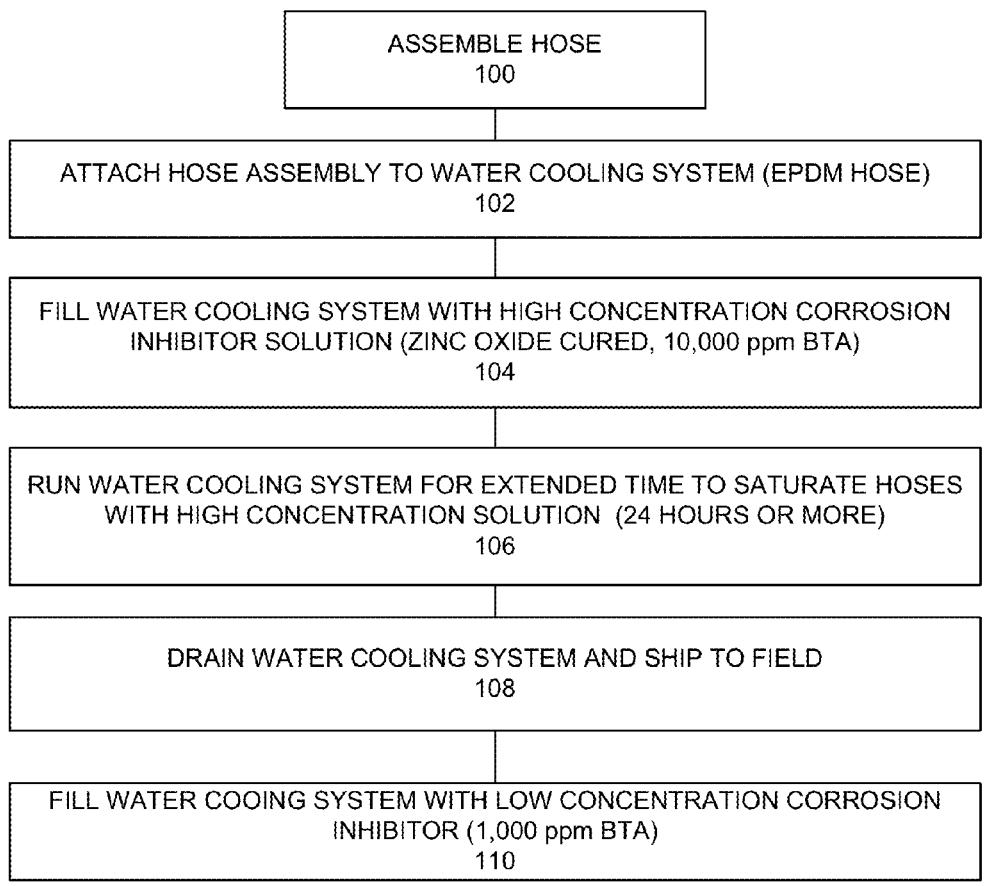
FIG. 1 is a flow chart illustrating exemplary steps for manufacturing pre-treated water cooling hoses for increased reliability in accordance with the preferred embodiment.

Having reference now to the drawings, in FIG. 1, there is shown a flow chart illustrating example steps for manufacturing pre-treated water cooling hoses for increased reliability in accordance with the preferred embodiment. The water cooling hose is assembled as indicated in a block 100.

As indicated at a block 102, the assembled water cooling hoses including EPDM water cooling hoses are attached to a water cooling system. For example, a zinc-oxide hose is first assembled with quick-connects, barbs, and clamps at block 100, and then assembled to a water cooling system at block 102.

The water cooling system is filled with a high concentration corrosion inhibitor solution as indicated in a block 104. Benzotriazole (BTA) is a heterocyclic compound containing three nitrogen atoms, with the chemical formula $C_6H_5N_3$ and is a common copper corrosion inhibitor that adsorbs to metal oxides including MgO, PbO, ZnO, and the like. These metal oxides are typically found in water cooling hoses, such as EPDM water cooling hoses.

The water cooling system is run for an extended time to saturate the water cooling hoses with the high concentration corrosion inhibitor solution as indicated in a block 106. During system test and pretreatment of the water cooling system at block 104, a high concentration of BTA, such as a 10,000 ppm BTA, is passed through the system in order to saturate the zinc oxide cured hoses and maintained for an extended time, such as 24 hours. Conventionally, a 1000 ppm BTA solution is used, while this low concentration is not sufficient to maintain acceptable levels of corrosion inhibitors over the life of a system.

Prior to shipping, the water cooling system is drained and then is shipped to the field for use as indicated in a block 108. The water cooling system is filled with a low concentration corrosion inhibitor solution, such as a 1,000 ppm BTA solution, as indicated in a block 110. By using pretreatment with the high concentration of BTA, the hose becomes saturated and the zinc oxide will no longer significantly deplete BTA.

In accordance with features of the invention, the use of the high concentration corrosion inhibitor solution for pre-treatment of the water cooling hoses is provided in order to maintain acceptable levels of corrosion inhibitors within the water cooling loop over the life of the system. Challenges are avoided that otherwise arise due to depletion of the corrosion inhibitors to other materials such as the hose, which ultimately may lead to the corroding of the copper components. The process of the invention to pre-treat water cooling hoses decreases the amount of depletion of the corrosion inhibitor within the water cooling loop improving the reliability of the cooling system. By pre-treating water cooling hoses, other hoses may be used that are most cost effective.

Figure 2:
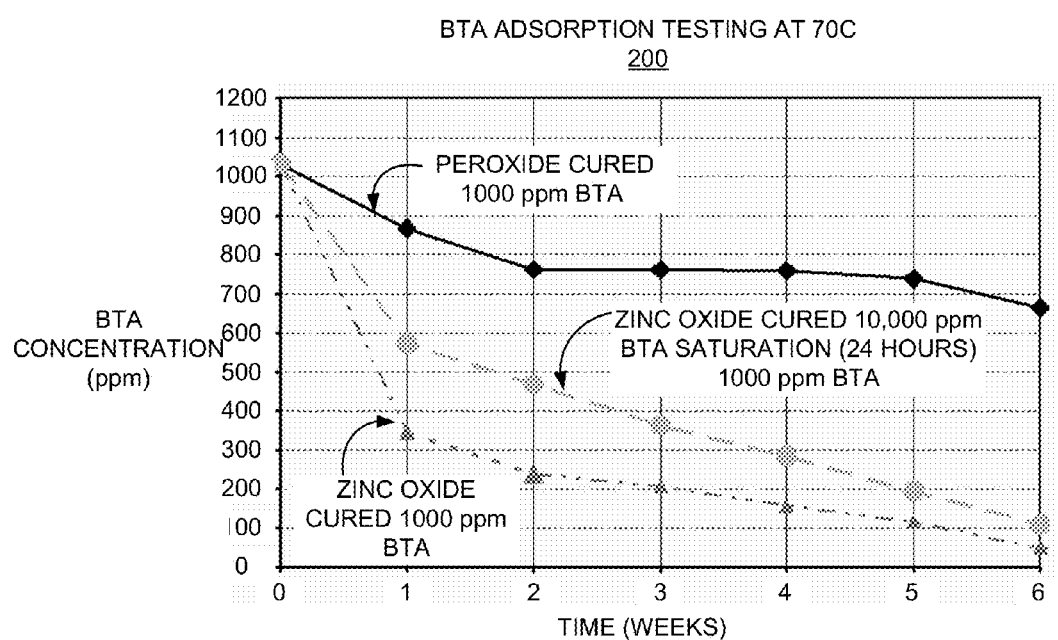
FIG. 2 is a chart illustrating exemplary improvement in pre-treated water cooling hoses in accordance with the preferred embodiment.

Referring also to the data of FIG. 2, illustrated are exemplary improvements in pre-treated water cooling hoses in accordance with the preferred embodiment. As shown, BTA adsorption testing at 70 degree C. is illustrated with BTA concentration in ppm shown relative to the vertical axis and time in weeks shown relative to the horizontal axis. Pre-treated water cooling hoses in accordance with the invention is illustrated by the dotted line labeled ZINC OXIDE CURED 10,000 ppm SATURATION (24 HOURS), 1000 ppm BTA relative to a high cost peroxide cured 1000 ppm BTA hose and a zinc oxide cured 1000 ppm BTA hose.

Typically, systems run 1000 ppm BTA solutions with the intent that the BTA will be maintained over the life of the system. For example, this is possible with peroxide cured hoses but not with zinc oxide cured hoses, as illustrated in FIG. 2. Pre-treated water cooling hoses in accordance with the invention enable running in 1000 ppm BTA solutions to maintain BTA over the life of the system.

It should be understood that the present invention is not limited to the example pretreatment time and high concentration of BTA provided in FIGS. 1 and 2, other pretreatment times and other high concentrations of BTA may be chosen by those skilled in the art.

While the present invention has been described with reference to the details of the embodiments of the invention shown in the drawing, these details are not intended to limit the scope of the invention as claimed in the appended claims.

What is claimed is:

1. A method for implementing pretreatment of water cooling hoses for increased reliability comprising:
   providing a water cooling hose attached to a first water cooling system;
   filling a first water cooling system with a first concentration corrosion inhibitor solution;
   running the first concentration corrosion inhibitor solution filled first water cooling system for a predefined time period to provide a pre-treated water cooling hose;
   draining the first concentration corrosion inhibitor solution; and
   filling a second water cooling system with a second concentration corrosion inhibitor solution for field use of the pre-treated water cooling hose, said first concentration corrosion inhibitor solution being a higher concentration corrosion inhibitor solution than said second concentration corrosion inhibitor solution.

2. The method as recited in claim 1 wherein providing said water cooling hose attached to the first water cooling system includes providing an ethylene propylene diene monomer (EPDM) water cooling hose attached to the first water cooling system.

3. The method as recited in claim 1 wherein providing said water cooling hose attached to the first water cooling system includes providing a zinc oxide cured water cooling hose attached to the first water cooling system.

4. The method as recited in claim 1 wherein filling the first water cooling system with a first concentration corrosion inhibitor solution includes filling the first water cooling system with a 10,000 ppm benzotriazole (BTA) solution.

5. The method as recited in claim 1 wherein filling the first water cooling system with a first concentration corrosion inhibitor solution includes filling the first water cooling system with a deionized water solution containing 10,000 ppm benzotriazole (BTA).

6. The method as recited in claim 1 wherein running the first concentration corrosion inhibitor solution filled water cooling system for a predefined time period includes running the first concentration corrosion inhibitor solution filled first water cooling system for an approximate 24 hour time period.

7. The method as recited in claim 1 wherein filling a second water cooling system with a second concentration corrosion inhibitor solution for field use of the pre-treated water cooling hose includes filling the second e water cooling system with a 1,000 ppm benzotriazole (BTA) solution.

8. A pre-treated water cooling hose produced by a method as recited in claim 1.

9. The pre-treated water cooling hose as recited in claim 8 includes a zinc oxide cured hose.

10. The pre-treated water cooling hose as recited in claim 8 includes an ethylene propylene diene monomer (EPDM) water cooling hose.

* * * * *